United States Patent
Demmerle

(10) Patent No.: US 10,144,372 B2
(45) Date of Patent: Dec. 4, 2018

(54) MOTOR VEHICLE ONBOARD ELECTRICAL SYSTEM AND BATTERY ASSEMBLY FOR THE LATTER

(71) Applicant: GM GLOBAL TECHNOLOGY OPERATIONS LLC, Detroit, MI (US)

(72) Inventor: Markus Demmerle, Nieder-Olm (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 253 days.

(21) Appl. No.: 15/054,031

(22) Filed: Feb. 25, 2016

(65) Prior Publication Data

US 2016/0244009 A1     Aug. 25, 2016

(30) Foreign Application Priority Data

Feb. 25, 2015 (DE) .................. 10 2015 002 357

(51) Int. Cl.
B60R 16/033 (2006.01)

(52) U.S. Cl.
CPC .................. *B60R 16/033* (2013.01)

(58) Field of Classification Search
CPC .................................................. B60R 16/033
USPC ....................................................... 307/10.1
See application file for complete search history.

(56) References Cited

U.S. PATENT DOCUMENTS

| | | | |
|---|---|---|---|
| 5,272,380 A * | 12/1993 | Clokie | H02J 9/002 307/10.7 |
| 5,576,686 A | 11/1996 | Westermeir et al. | |
| 5,578,391 A | 11/1996 | Meyers et al. | |
| 5,909,103 A | 6/1999 | Williams | |
| 6,049,140 A | 4/2000 | Alksnat et al. | |
| 7,129,598 B2 | 10/2006 | Wagner et al. | |
| 7,504,804 B2 | 3/2009 | Johnson et al. | |
| 7,638,976 B2 | 12/2009 | Sim et al. | |
| 8,749,935 B2 | 6/2014 | Xia | |
| 2008/0151454 A1 | 6/2008 | Uhl | |
| 2010/0308647 A1 | 12/2010 | Fluhrer et al. | |
| 2011/0001354 A1 * | 1/2011 | Lindstrom | F02N 11/0866 307/9.1 |
| 2011/0127830 A1 * | 6/2011 | Harding | B60R 16/033 307/10.7 |
| 2011/0273809 A1 | 11/2011 | Falsett et al. | |

(Continued)

FOREIGN PATENT DOCUMENTS

| | | | |
|---|---|---|---|
| CN | 203666411 U * | 6/2014 | |
| DE | 19952112 A1 | 6/2001 | |
| JP | 2006174619 A | 6/2006 | |

OTHER PUBLICATIONS

German Patent Office, German Search Report for German Application No. 102015002357.8, dated Nov. 19, 2015.

Primary Examiner — Jared Fureman
Assistant Examiner — Michael Warmflash
(74) Attorney, Agent, or Firm — Lorenz & Kopf, LLP

(57) ABSTRACT

An onboard electrical system for a motor vehicle includes a storage device with at least one first battery pack and a plurality of electrical loads supplied from the storage device. At least one control unit is configured to control the consumption of electrical energy by the remaining electrical loads. A main switch is controlled by the control unit and an auxiliary switch that can be manually activated, so as to connect the control unit with the first battery pack and activate the control unit to send a close command to the main switch.

14 Claims, 2 Drawing Sheets

(56) References Cited

U.S. PATENT DOCUMENTS

2012/0313381 A1 12/2012 Pelaez et al.
2014/0184153 A1* 7/2014 Saint-Leger .............. H02J 7/00
                                                    320/108

* cited by examiner

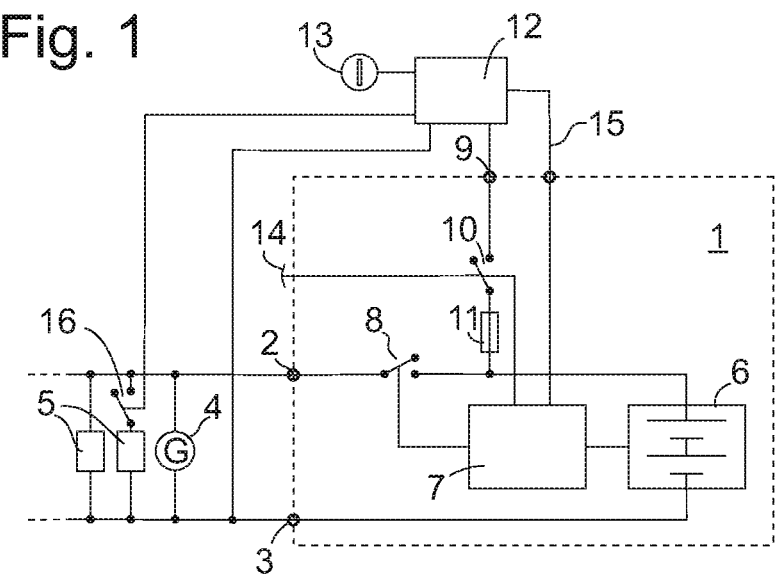
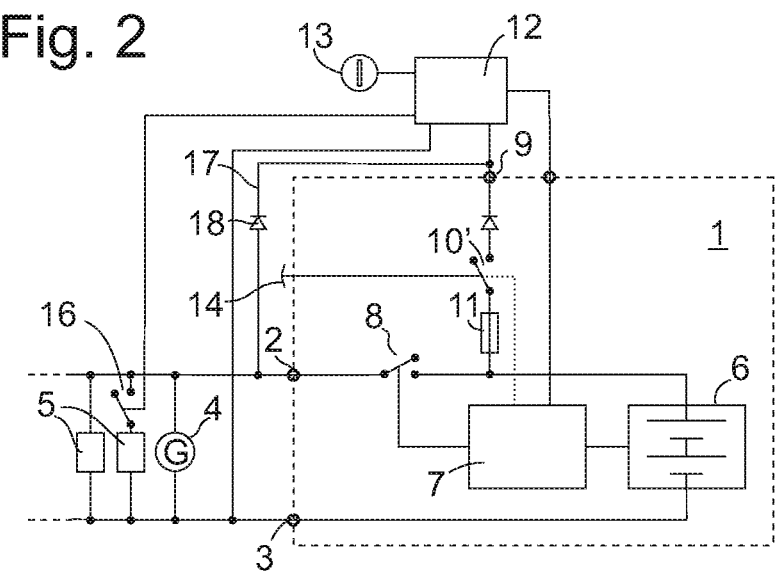

MOTOR VEHICLE ONBOARD ELECTRICAL SYSTEM AND BATTERY ASSEMBLY FOR THE LATTER

CROSS-REFERENCE TO RELATED APPLICATION

This application claims priority to German Patent Application No. 102015002357.8, filed Feb. 25, 2015, which is incorporated herein by reference in its entirety.

TECHNICAL FIELD

The present disclosure pertains to an onboard electrical system for a motor vehicle and a battery assembly therein.

BACKGROUND

The lead accumulators that have been in use for decades as battery assemblies for motor vehicle onboard electrical systems exhibit a self-discharge, which if the vehicle has not been used over a period of several months, leads to a complete discharge and destruction of the battery. In order to make the vehicle operational again in such a case, a new battery has to be installed, which is associated with significant effort and costs. In particular, in vehicles that are produced for export and transported to the customer overseas, the time between when the vehicle was manufactured and when it was delivered to the customer can be so long, and the distances covered by the vehicle under its own power over this period can be so short, that the battery has experienced damage at the point it is handed over to the customer.

Many modern vehicles have electrical loads that normally remain in operation when the vehicle is parked and its motor is turned off, such as a remote controlled door unlocking device, an alarm system or the like. Such loads can also lead to a destructive exhaustive discharge even in a battery pack with a low self-discharge given an extended downtime.

Known in battery assemblies with lithium-ion cells is to provide an electrically controlled main switch, which can be used to separate the cells of the battery assembly from their terminals. Such a main switch may be necessary for safety reasons, so as to interrupt the flow of electricity given a short circuit in one of the loads supplied by the battery assembly, and thereby prevent overheating, which might cause the battery assembly to catch on fire. Such a battery pack can also be used for supplying the onboard electrical system in a motor vehicle, wherein a very long service life is possible for the battery with the main switch open, without there being any danger of an exhaustive discharge. In order to close the main switch again, however, it must be exposed to an electrical control signal that cannot be generated from the onboard electrical system of the vehicle if the latter is completely decoupled from the battery assembly. Introducing such a control signal from outside requires that a suitable signal source be present, which cannot be assumed in the case of an end user. However, even if battery packs in a large number of vehicles have to be reactivated, for example after a lengthy maritime transport, connecting a signal source and sending out the required signals is a time-consuming process.

SUMMARY

The present disclosure provides an onboard electrical system for a motor vehicle which is insensitive to prolonged nonuse and can thereupon be easily started back up. In an embodiment of the present disclosure, an onboard electrical system for a motor vehicle with a storage device includes at least one first battery pack, and a plurality of electrical loads supplied from the storage device. At least one control unit is set up to control the consumption of electrical energy by the remaining electrical loads. A main switch is controlled by the control unit and an auxiliary switch that can be manually activated, so as to connect the control unit with the first battery pack, and thereby enable it to send a close command to the main switch. By opening the main switch, energy consumption by the onboard electrical system can be cut virtually to zero, since those loads that normally remain in operation when the vehicle is parked can also be separated from the storage device. As a result, the battery pack cannot be discharged by this load. The auxiliary switch can be used to supply the energy required for actuating the main switch to the control unit, so that no signal source external to the vehicle has to be hooked up for this purpose.

The loads that are cut off from the power supply with the main switch open can, and preferably should, include the control unit itself, since it can be reactivated by closing the auxiliary switch, and consequently release the power supply to the remaining loads again.

The auxiliary switch can be unstable in the closed state, so that it only remains in this state for as long as it is held there by hand. It can thereby be ensured that the control unit is also turned off every time the main switch is opened. Alternatively, the auxiliary switch might be manually activated, but electrically actuated to be opened, so that it can be opened by the control unit as soon as the power supply to the loads has been reestablished via the main switch.

It should be possible to supply the control unit with electrical power via the main switch, so that it remains in operation when the auxiliary switch returns to the open state. In a closed state, the main switch should further also connect those loads with the first battery pack that are indispensable to the movement of the motor vehicle, such as a starter. In this way, the vehicle can at least be started up, and an alternator can be used to cover any further demand for electrical power.

It is best that the storage device further include a second battery pack. The main switch can then switch directly to the open state as the vehicle switches to an idle state. The energy demand for loads that should remain active in the idle state can then be covered by the second battery pack. The charging capacity of this second battery pack can exceed that of the first. In this way, the costs of the onboard electrical system can be kept within limits even if the first battery pack is a very high quality, and correspondingly expensive, type.

In particular, the first battery pack selected can be a type with a lower self-discharge than that of the second battery pack. For example, a lithium-ion accumulator as the first battery pack can be combined with an inexpensive lead accumulator as the second battery pack.

As an alternative to the aforementioned immediate opening when the vehicle switches to the idle state, it can be provided that the main switch is only opened when the residual charge of the first battery pack drops below a threshold value. Loads that are to remain in operation even with the vehicle in an idle state can then continue to be supplied by the first battery pack at least until such time as continuing to discharge the first battery pack could make restarting the vehicle impossible.

The first battery pack, main switch and auxiliary switch are preferably combined into a replaceable battery assembly. As a result, short circuits or creeping currents that may arise outside of the battery assembly in the vehicle cannot lead to a critical discharge of the battery pack.

In another embodiment of the present disclosure, a battery assembly for a motor vehicle onboard electrical system as described above includes a battery pack, main terminals, at least one auxiliary terminal, an electrically controlled main switch for connecting the battery pack with the main terminals, and a manually activated operating switch for connecting the battery pack with the auxiliary terminal. A fuse can be provided between the first battery pack and auxiliary terminal, so that, in the event that a technical malfunction of a connected load leads to a strong current flow over the auxiliary terminal, it can interrupt the latter and thereby prevent a deep discharge of the battery pack.

BRIEF DESCRIPTION OF THE DRAWINGS

The present disclosure will hereinafter be described in conjunction with the following drawing figures, wherein like numerals denote like elements.

FIG. 1 is a block diagram of an onboard electrical system in a motor vehicle with a battery assembly according to a first embodiment of the present disclosure;

FIG. 2 is an onboard electrical system according to a second embodiment; and

DETAILED DESCRIPTION

Figure 3:
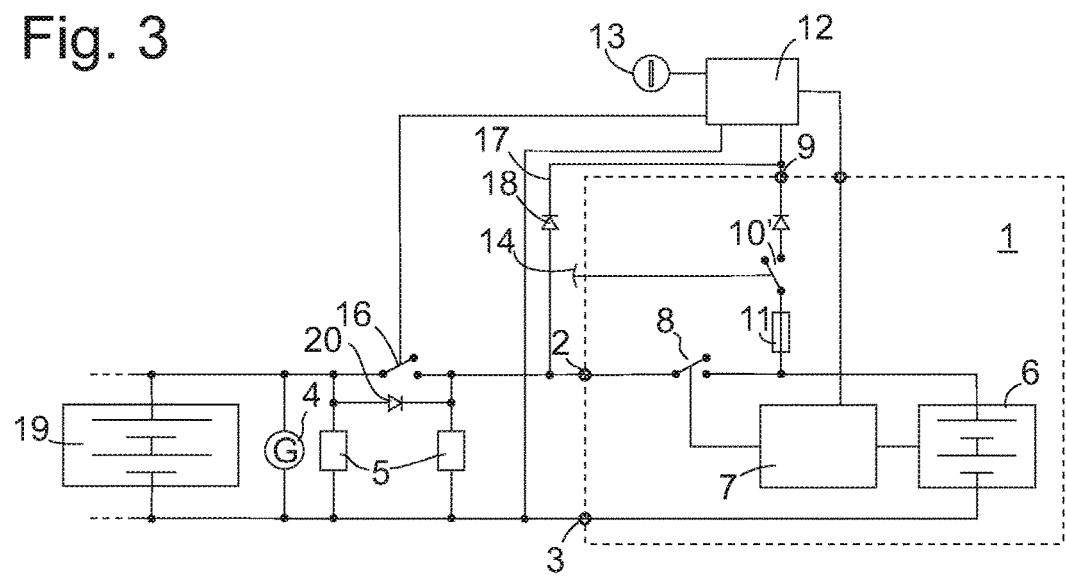
FIG. 3 is an onboard electrical system according to a third embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

In the onboard electrical system on FIG. 1, a battery assembly 1 is connected by way of main terminals 2, 3 with an alternator 4 along with various electrical loads 5, such as headlights, an engine controller, a starter, display instruments on the vehicle dashboard, a radio, etc., so as to be charged by the alternator 4 or supply the loads 5 if the alternator 4 is not in operation or does not have enough power to cover the demand of the loads 5.

The battery assembly 1 has a fixed, replaceable housing mounted in the vehicle, on whose exterior the main terminals 2, 3 and a shunt 9 are accessible. The housing includes a battery pack 6, typically having several rechargeable electrochemical cells, such as lithium-ion accumulators. An internal control unit 7 monitors the charge state of the individual cells in the battery pack 6 and controls the process of charging them with current from the alternator 4. The internal control unit 7 further controls a main switch 8, which can be used to decouple the battery pack 6 from the main terminal 2 and from loads 5 outside of the battery assembly 1 connected thereto, as well as from the alternator 4.

The shunt 9 is connected with the anode of the battery pack 6 via an auxiliary switch 10 and a fuse 11. An external control unit 12 outside of the battery assembly 1 is connected with the shunt 9 and ground main terminal 3, so as to be supplied with operating voltage when the auxiliary switch 10 is closed. The external control unit 12 here includes in particular a mechanical or electronic ignition lock 13, which can be actuated by the driver with a mechanical key or a transponder in order to start up the vehicle.

If the vehicle is in operation, switches 8, 10 are closed, and all loads connected to the battery assembly 1, both the loads 5 and external control unit 12, are supplied in the usual way. If the driver turns off the ignition, switches 8, 10 initially remain closed, and the internal control unit 7 monitors the charge state of the battery pack 6. If loads 5 remain in operation with the vehicle parked, a charge state of the battery pack 6 can be reached after a lengthy downtime of the vehicle that does not ensure a proper restarting of the vehicle. The internal control unit 7 opens the switches 8, 10 in time before this happens. Connected loads are now prevented from further discharging the battery pack 6, and any charge losses at this point can only arise from the self-discharge of the battery pack 6. Since this occurs to significantly less of an extent in lithium-ion accumulators than in a conventional lead battery, the vehicle can be left unused for a considerable length of time even after opening the switches 8, 10 before the starting capability of the vehicle is actually diminished.

The driver can tell when the internal control unit 7 intervenes while attempting to start up the vehicle from the fact that all loads 5 are dead, and the external control unit 12 does not respond to an actuation of the ignition lock 13. In order to start the vehicle nonetheless, the driver must gain access to the installation site of the battery assembly 1, for example by opening a door or the hood, so as to actuate an key 14 exposed on the outside of the housing of the battery assembly 1, and thereby close the auxiliary switch 10. As a result, only the external control unit 12 is initially supplied with operating voltage, while the loads 5 remain dead.

In the simplest case, the external control unit 12 now, e.g., when the driver actuates the ignition lock 13 again for startup, sends a command in the form of an electrical signal by way of a control line 15 to the internal control unit 7, whereupon the latter closes the main switch 8, and thereby allows the loads 5 to operate again.

One expedient variant distinguishes between loads 5 that are indispensable for starting up the vehicle, such as an engine controller or a starter on the one hand, and loads that, while they might potentially have to be functional so that the vehicle can move on the roadway, are not required for operating the engine and alternator 4, such as headlights, and loads that are unimportant to the ability of the vehicle to move, such as radios or air conditioners. When sending the command to close the main switch 8 to the internal control unit 7, the external control unit 12 can in this case be set up to first block the operation of the loads 5 not absolutely required, here by means of an additional switch 16, and only allow it again once the engine has been started up and a stable operation of the alternator 4 has been ensured, which also covers the demands of these latter loads.

The embodiment on FIG. 2 differs from the one on FIG. 1 in that the auxiliary switch 10' on FIG. 2 is not stable in the closed state, but rather only remains in the closed state for as long as the key 14 is pressed. The inner structure of the battery assembly is thereby simplified, since no signal connection is required between the internal control unit 7 and the auxiliary switch 10' to open the latter.

In this embodiment, if the driver determines that the electrical loads 5 of the vehicle are dead, and thereupon actuates the key 14, the external control unit 12 is here also supplied with operating current, and sends a command to close the main switch 8 to the internal control unit 7. If this command has been executed and the driver again releases the key 14, the voltage continues to be supplied to the external control unit 12 via a line 17 that connects the terminals 2 and 9 outside of the battery assembly 1. A diode 18 in the line 17 prevents the loads 5 from also being supplied by closing the auxiliary switch 10'. This ensures that the loads 5 will not cause a drop in the terminal voltage of the battery pack 6 at the moment the main switch 10' is closed that could call into question the proper functioning of the control unit 7, 12, or a current flow over the shunt 9 that might trigger a response by the fuse 11, and the external control unit 12 has a chance to cut off supply to loads 5 that are not absolutely required by way of the switch 16 before initiating the closure of the main switch 8. If the driver turns off the vehicle again, the auxiliary switch 10' has already been open for some time, and the main switch 8 is opened under the same conditions as for FIG. 1.

In the embodiment on FIG. 3, a second battery pack 19 is additionally provided, for example a conventional lead battery, in order to supply the loads 5 and the external control unit 12. A switch 16 can be used to separate the second battery pack 19, the alternator 4 and the loads 5 not absolutely necessary for starting up the vehicle from the main terminal 2 of the battery assembly 1. The loads 5 indispensable for starting up the vehicle are directly connected with the main terminals 2, 3.

If the vehicle is in operation, the main switch 8 and switch 16 are closed, so that the external control unit 12 and all loads 5 are supplied via the main terminal 2, and the alternator 4 can charge both battery packs 6, 9. The auxiliary switch 10' is only stable in the open position and thus also open while the vehicle is in operation. If the vehicle is parked, the control unit 12 opens the switch 16 and sends a command to open the main switch 8 to the internal control unit 7. Opening the switch 16 only ensures that the loads 5 not required for starting up the vehicle do not burden the battery pack 6 during a subsequent restart. In addition, the battery pack 19 is connected with all loads 5, some directly, the others required for starting up the vehicle as well as the external control unit 12 by way of a diode parallel to the switch 16. The terminals 2, 3, 9 of the battery assembly 1 are all dead, thereby precluding a discharge of the battery pack 6 by creeping current or technical malfunctions outside of the battery assembly 1.

If the vehicle is restarted in the usual way, the external control unit 12 is supplied from the battery pack 19 and responsive, prompting the switch 8, 16 to close. By contrast, if the battery pack 19 has been depleted to a point where it can no longer supply the power needed for startup while starting up the vehicle, the driver recognizes this from the fact that the control unit 12 is not responsive, or while it is responsive, the starter power is insufficient for starting up the engine. In order to start up the vehicle nonetheless, the driver again actuates the key 14 so as to close the auxiliary switch 10. The external control unit 12 thereupon supplied with power from the battery pack 6 again prompts the internal control unit 7 to close the main switch 8, so that the loads 5 indispensable for startup are also supplied from the battery pack 6. This ensures that the engine and alternator 4 can be started up. In normal cases, the battery pack 19 should then be recharged by the alternator 4. Should this no longer be possible, because the battery pack 19 has been damaged by a deep discharge and must be replaced, the vehicle can still be started up with power from the battery pack 6, so that a workshop can be found for replacing the battery pack 19.

The embodiment on FIG. 3 makes it possible to also start up the vehicle when the battery pack 19 is completely missing. Therefore, the battery pack 19 can initially be left out when manufacturing the vehicle, and the vehicle can be exported without a battery pack 19; an amount of energy required for short proper motions of the vehicle can be stored in the battery pack 6. Only using the battery pack 19 shortly before delivering the vehicle to a customer makes it possible to prevent damage to the battery pack 19 through self-discharge.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An onboard electrical system for a motor vehicle comprising:
   a first external control unit having an ignition lock configured to selectively operate the vehicle;
   a storage device including at least one first battery pack;
   a plurality of electrical loads supplied from the storage device;
   a second control unit powered by the first battery pack and configured to monitor a state of charge for the first battery pack and control the consumption of electrical energy by the electrical loads;
   a first switch configured to isolate the storage device from the plurality of electrical loads in response to a control signal from the second control unit; and
   a manually-activated second switch configured to selectively connect the external control unit with the first battery pack for sending a command to the second control unit for closing the first switch to electrically couple the storage device to the plurality of electrical loads.

2. The onboard electrical system according to claim 1, wherein the second switch is unstable in the closed state.

3. The onboard electrical system according to claim 2, wherein the first switch in a closed state connects a supply terminal of the first external control unit with the first battery pack.

4. The onboard electrical system according to claim 3, wherein the first switch in the closed state connects a load that is indispensable for the movement of the motor vehicle with the first battery pack.

5. The onboard electrical system according to claim 1, wherein the storage device further comprises a second battery pack configured to supply the plurality of electrical loads.

6. The onboard electrical system according to claim 5, wherein a charging capacity of the second battery pack exceeds a charging capacity of the first battery pack.

7. The onboard electrical system according to claim 5, wherein the first switch switches to an open state when the first external control unit indicates that the vehicle is in an idle state.

8. The onboard electrical system according to claim 7, wherein a charging capacity of the second battery pack exceeds a charging capacity of the first battery pack.

9. The onboard electrical system according to claim 5, wherein the self-discharge of the first battery pack is lower than the self-discharge of the second battery pack.

10. The onboard electrical system according to claim 1, wherein the second control unit switches the first switch to an open state for isolating the storage device from the plurality of electrical loads when a residual charge of the first battery pack drops below a threshold value.

11. The onboard electrical system according to claim 1, further comprising a replaceable battery assembly including the first battery pack, the first switch, the second control unit and the second switch.

12. A battery assembly for an onboard electrical system of a motor vehicle comprising having a first external control unit configured to selectively operate the vehicle and a plurality of electrical loads, the battery assembly comprising;
- a housing having a main terminal configured to electrically connect with the plurality of electrical loads and an auxiliary terminal configured to electrically connect with the first external control unit;
- a first battery pack disposed in the housing;
- a second control unit disposed in the housing and powered by the first battery pack and configured to monitor a state of charge for the first battery pack and control the consumption of electrical energy by the electrical loads;
- a first switch configured to isolate the first battery pack from the main terminal in response to a control signal from the second control unit; and
- a manually-activated second switch configured to selectively connect the auxiliary terminal with the first battery pack for sending a command to the second control unit for closing the first switch to electrically couple the storage device to the plurality of electrical loads.

13. The battery assembly according to claim 12, further comprising a fuse arranged between the first battery pack and the auxiliary terminal.

14. The battery assembly according to claim 12, further comprising a key secured to the housing wherein the second switch is configured to be actuated by the key.

* * * * *